(12) United States Patent
Maguire

(10) Patent No.: US 7,758,294 B2
(45) Date of Patent: Jul. 20, 2010

(54) BUCKET WITH LATERAL DISCHARGE

(75) Inventor: Dennis R. Maguire, Lucan (CA)

(73) Assignee: Maguire Super-Shield Ltd., Lucan, Ontario (CA)

( * ) Notice: Subject to any disclaimer, the term of this patent is extended or adjusted under 35 U.S.C. 154(b) by 0 days.

(21) Appl. No.: 11/768,348

(22) Filed: Jun. 26, 2007

(65) Prior Publication Data

US 2008/0000757 A1    Jan. 3, 2008

Related U.S. Application Data

(60) Provisional application No. 60/805,816, filed on Jun. 26, 2006.

(51) Int. Cl.
*E02F 9/00* (2006.01)
(52) U.S. Cl. ........................... 414/725; 414/722

(58) Field of Classification Search ............... 414/725, 414/722; 198/844.1, 863, 667, 832
See application file for complete search history.

(56) References Cited

U.S. PATENT DOCUMENTS

| | | | | | |
|---|---|---|---|---|---|
| 3,292,804 | A | * | 12/1966 | Veneman | 414/659 |
| 4,377,365 | A | * | 3/1983 | Layh | 414/334 |
| 5,772,389 | A | * | 6/1998 | Feller | 414/489 |
| 5,827,038 | A | * | 10/1998 | Barden | 414/725 |
| 6,919,122 | B2 | * | 7/2005 | Keese et al. | 428/167 |
| 2007/0175737 | A1 | * | 8/2007 | Honeycutt et al. | 198/822 |

* cited by examiner

*Primary Examiner*—Donald Underwood

(57) ABSTRACT

A bucket used in association with a loader provides both top and lateral discharge. The bucket is defined by a frame with front and rear walls, as well as a pair of side walls, and an endless loop of conveyor belt that serves as a bottom to the bucket. Lateral discharge provided through a gap between the endless loop and each of the side walls. A slide at a bottom of each side wall at least partially fills the gap between the side wall and the endless loop. The endless loop is selectively driven in the direction of either of the side walls by a drive means contained within the frame.

11 Claims, 6 Drawing Sheets

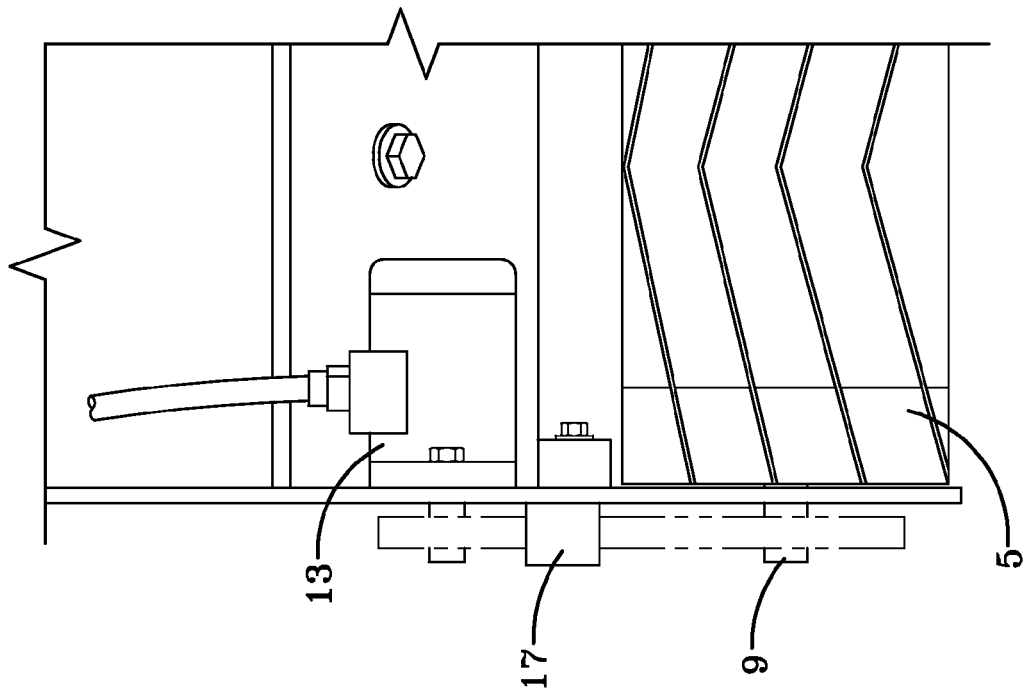
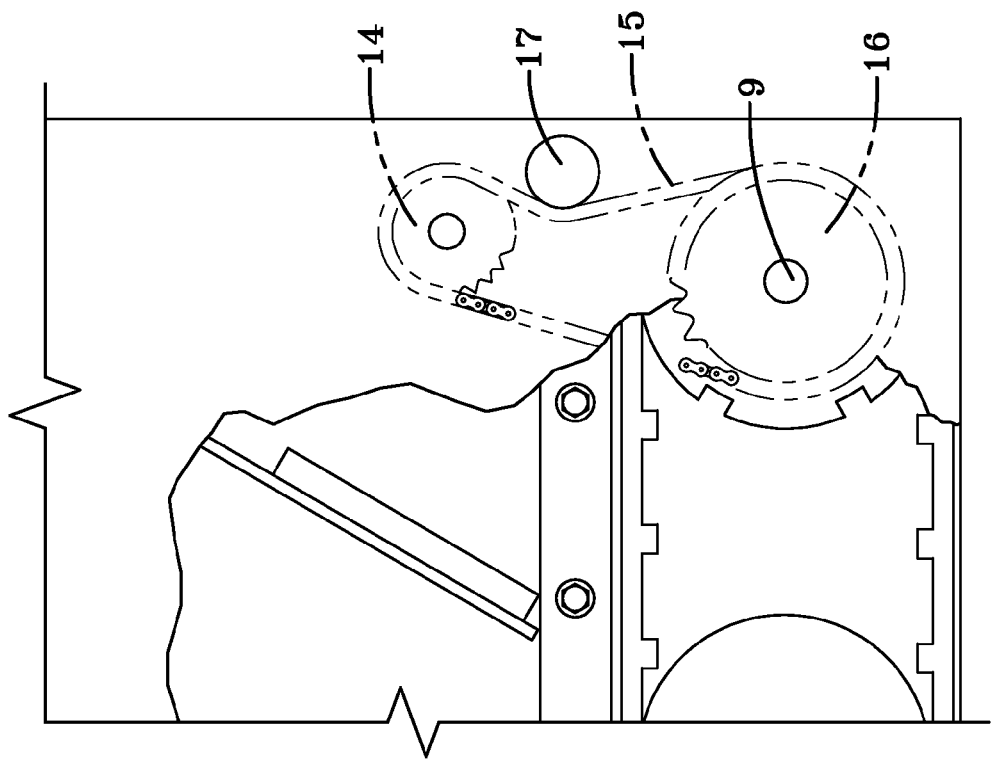

BUCKET WITH LATERAL DISCHARGE

CROSS-REFERENCE TO RELATED APPLICATIONS

This application is a non-provisional of U.S. provisional application 60/805,816, filed 26 Jun. 2006, the content of which is incorporated by reference as if fully recited herein.

TECHNICAL FIELD

The present invention relates to an improved apparatus for the delivery of aggregates, such as sand or gravel. In particular the invention relates to a bucket that can laterally unload aggregates from a variety of heights and can be maneuvered into close-fitting spaces.

BACKGROUND OF THE ART

In such industries as landscaping, there is often the need to place aggregates in close-fitting spaces around residential pools, narrow trenches and the like. Conventional mechanized delivery methods for aggregates rely on large machinery, which cannot fit in such close-fitting spaces. Consequently, the transport and placement of aggregates in such spaces is usually done manually. It is in any event desirable to deliver and unload aggregates in close-fitting spaces more rapidly and efficiently, as well as at different heights.

SUMMARY OF THE INVENTION

The present invention comprises a lateral discharge bucket, which can be attached to small loaders, such as a BOBCAT® loader. The bucket has generally the shape of a conventional bucket and is attached to the loader through an industry standard bucket attachment. The bucket is controlled from the loader's control panel through an industry standard hydraulic connection.

The bottom portion of the bucket consists of a conveyor-like discharge belt, which can operate in either direction to discharge and unload aggregates from inside the bucket through lateral openings on both sides of the bucket. The bucket therefore can be maneuvered by the loader into close-fitting areas with one of the lateral openings oriented in the desired direction. Once the discharge belt is put in motion, the aggregates can be unloaded easily, rapidly and efficiently. The delivery of aggregates can also take place while the loader is in motion, such as for example when filling a narrow trench. Another advantage of the present invention is that during the delivery operation the motion of the discharge belt loosens compacted aggregates, which has the advantage of "fluffing" or "aerating" the contents during discharge.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIGS. 5A and 5B are enlarged partial section front elevation and side views, respectively, of the hydraulic drive mechanism shown in the FIG. 1 embodiment;

DESCRIPTION OF PREFERRED EMBODIMENTS

Figure 1:
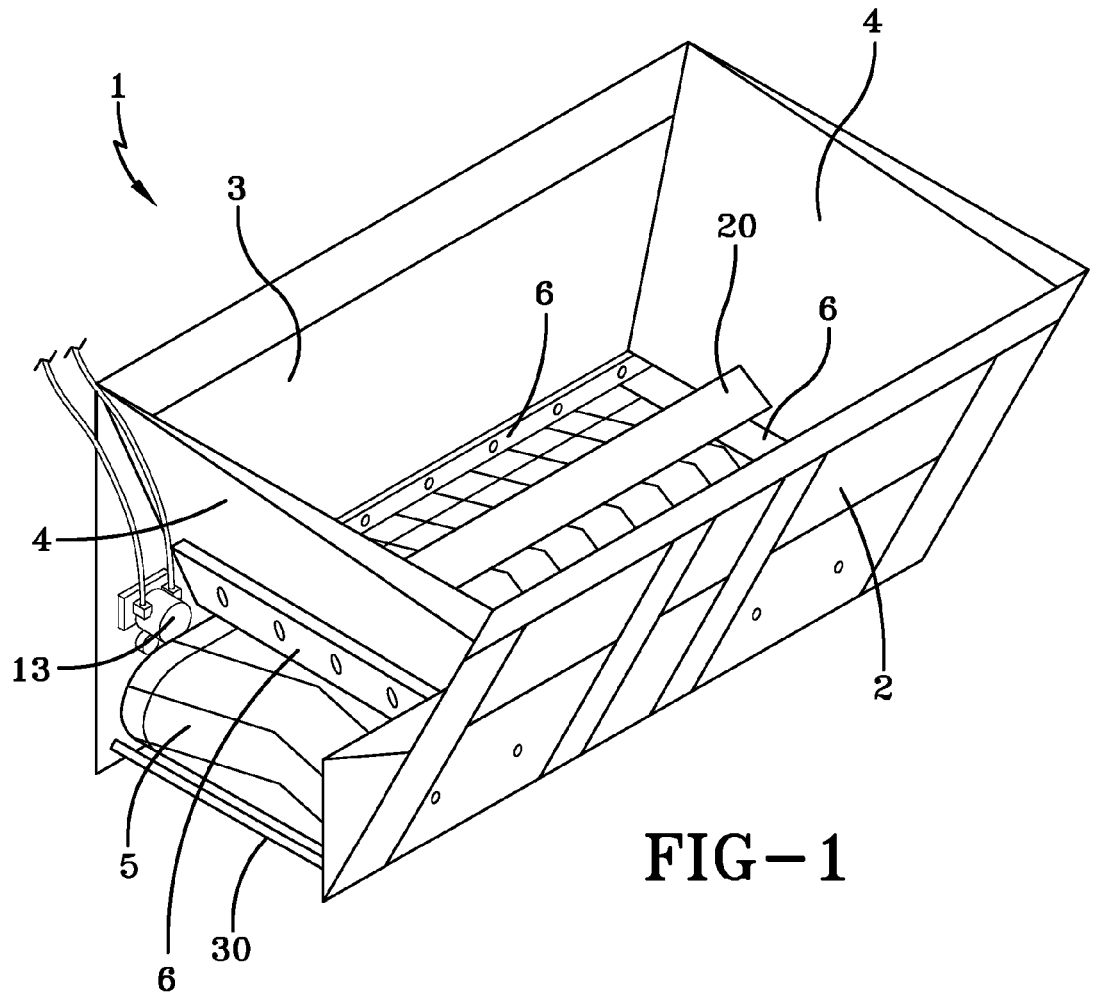
FIG. 1 is perspective view of the bucket.

Referring now to FIG. 1, the bucket 1 has a front wall 2, a rear wall 3 and a pair of opposing sidewalls 4. Walls 2, 3 and 4 are sloped inward to facilitate the sliding of aggregates toward a bottom of the bucket 1. Another advantage of the inward sloping of the walls is that less pressure is applied to the bottom of the bucket 1 when aggregates are present in the bucket.

Referring again to FIG. 1, front wall 2 and rear wall 3 extend downwardly beyond the bottom of bucket 1 to form a downwardly open rectangular-like frame which houses and supports the discharge conveyor belt mechanism 5 and its driving mechanism described below. As the frame is open at the bottom, it allows for any trapped aggregates inside the belt mechanism to be easily ejected.

Discharge belt 5 is made of a rubber material and effectively forms the bottom of the bucket 1. The surface of the belt will usually have raised ribs or elements formed integrally with the belt, providing a ribbed surface for aggressive and effective movement of aggregates along the belt 5 during the unloading operation. However, in some operation, particularly in handling unset concrete, I may be preferred to provide the belt without any raised surface features.

At the interface between the metal bucket elements and moving belt portions there are installed wearable plastic slides 6 to prevent wear of the metal bucket edges through abrasion when adjacent aggregates are moved and discharged. These are installed in any preferable way and also serve to prevent or minimize the sideways trapping movement of aggregates into the drive mechanism.

Wearplates 6 are attached at the bottom of sidewalls 4 as shown, adjacent to the area of belt movement. Wearplates 6 are of an appropriate width and overhang the adjacent covered edges of bucket 1. In this way sidewalls 4 are protected from the abrasive wear produced by contact with aggregates.

Figure 7:
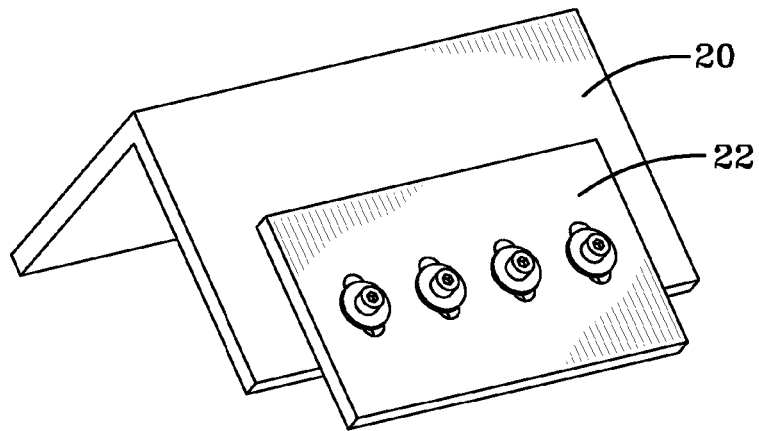
FIG. 7 shows an enlarged perspective view of a portion of angled beam 20, illustrating an optional plate 22.

In some embodiments, an angled beam 20, especially a piece of "L" bar, may be positioned above the top surface of the conveyor belt 5 inside the bucket 1. The angled beam may be removably inserted, so that it is used when useful for the material being operated upon and removed when it is not useful. In either case, the angled beam 20 spans the distance between the sidewalls 4, preferably slightly above the wearplates 6. The angled beam 20 runs across the bucket with its longitudinal axis running parallel to the direction of travel of the conveyor belt 5. As further shown in FIG. 7, the angled beam 20 may be provided, on one or both arms, with an adjustable plate 22 that allows a gap between the bottom of the beam and the conveyor belt to be adjustably set.

A further optional feature shown in FIG. 1 is a scraping or doctor blade 30, positioned transverse to the endless loop of conveyor belt 5, especially below the turning point of the loop. When the bucket 1 is used to deliver a material such as unset concrete, this blade is useful in cleaning excess material off of the belt 5.

Figure 2:
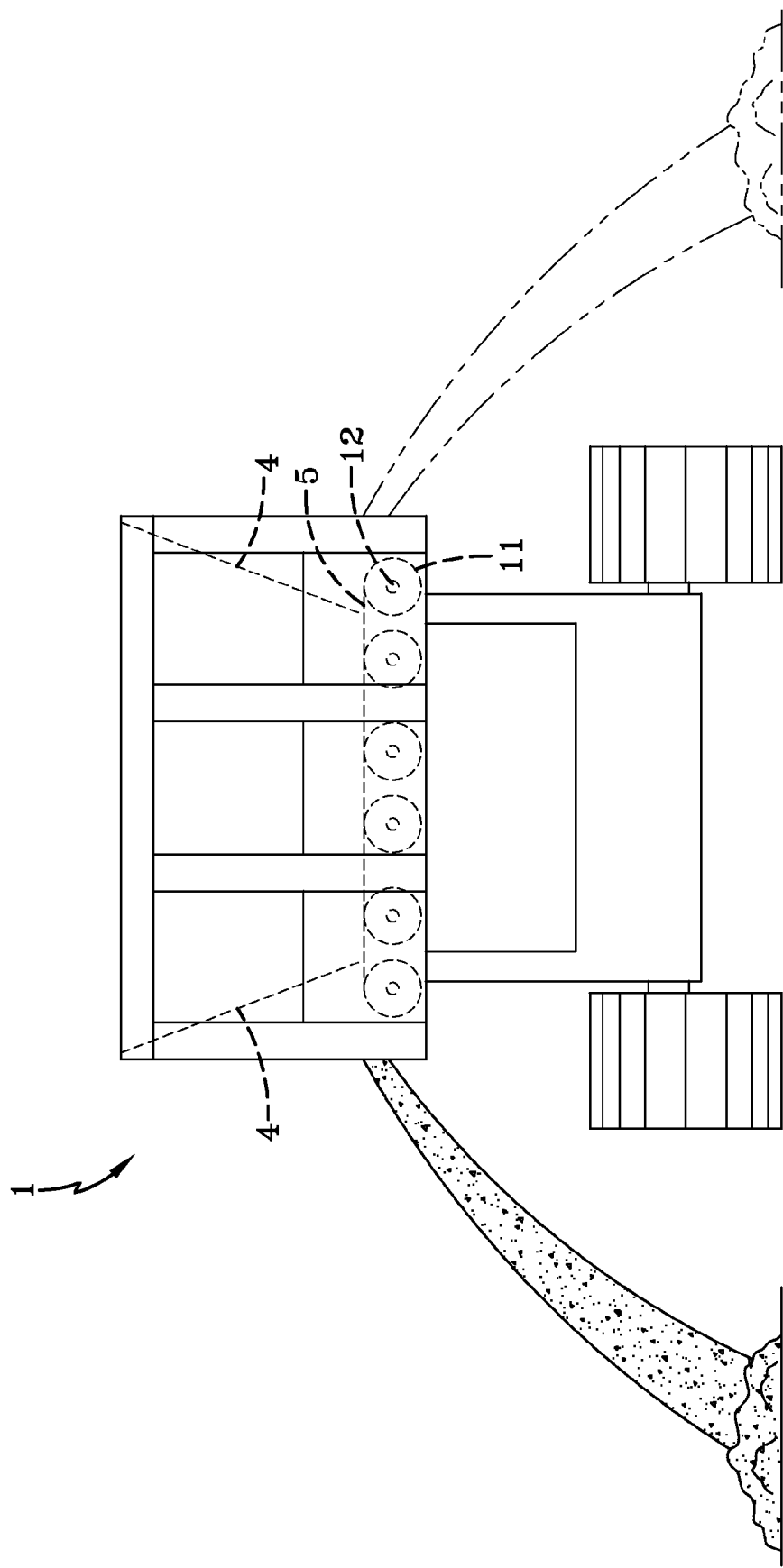
FIG. 2 is a front elevation view of the bucket mounted on a loader.

Referring to FIG. 2, a front view of the bucket 1 is shown mounted on a loader. There is a gap between the sidewalls 4 and the conveyor belt through which material may be ejected. Material is ejected when the conveyor belt 5 is rotated and idler wheels 11 attached to idler wheel axles 12 are rotating. The wheels may be rotated in either direction, and therefore material may be ejected out of either side of the bucket 1.

Figure 3:
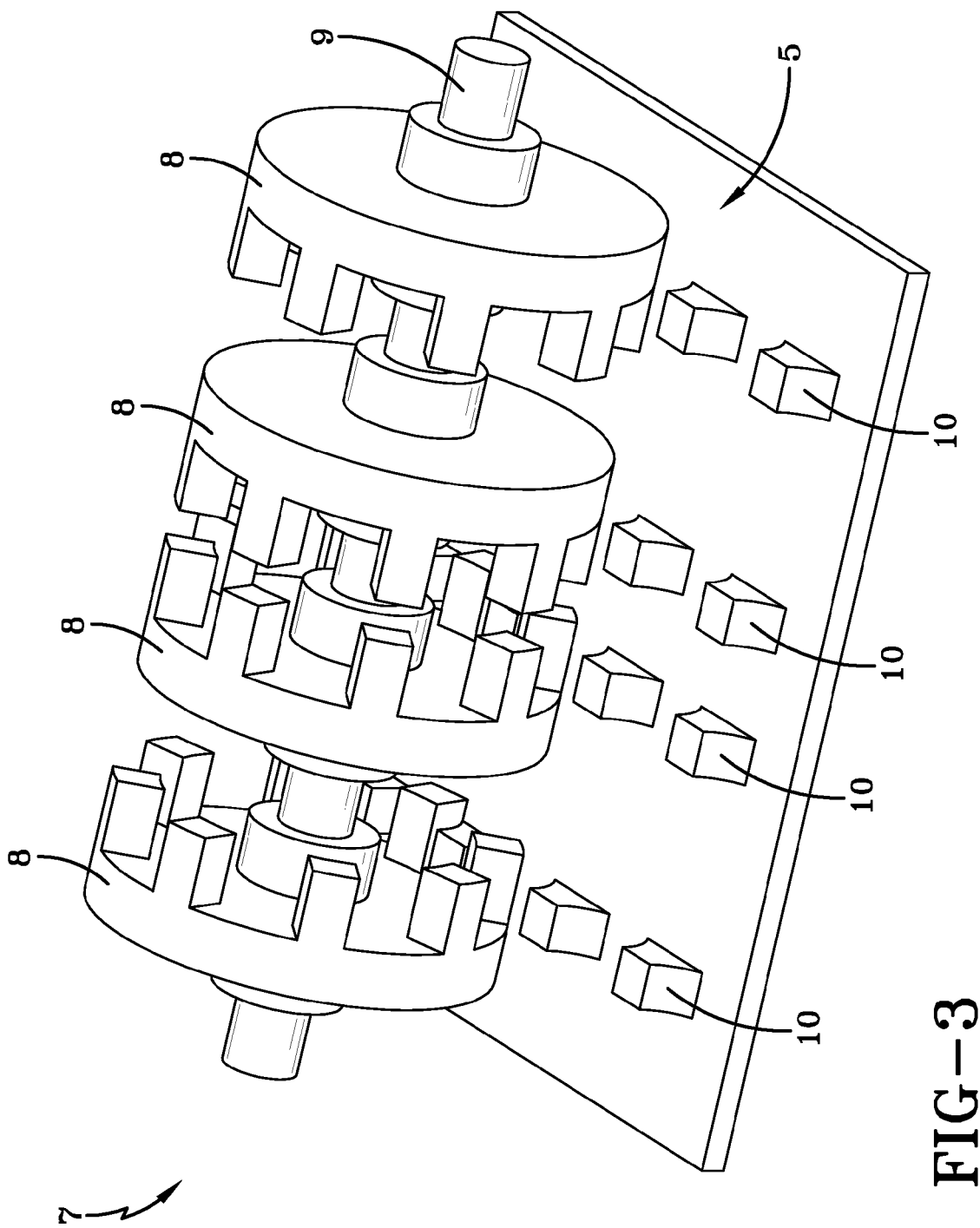
FIG. 3 is a photograph view of the drive wheel axle and sprocket in position relative to the underside of the discharge belt.

Referring now to FIG. 3, the drive wheel 7 is shown comprising four drive sprockets 8 fixedly secured to drive wheel axle 9. Drive wheel axle 9 is rotationally placed in motion by the hydraulic drive motor described infra with reference to FIGS. 5A and 5B, and can rotate in either longitudinal direction. Drive axle 9 is rotationally and securely attached within the open bottom frame element described above.

The underside of the discharge belt at 5 comprises four rows of protrusions 10, hereafter called drive knobs, horizontally aligned along the width of the belt 5, to be engaged by the four sprockets 8 of the drive wheel 7. As each successive row of sprockets rotationally engages the drive knobs, movement of the belt, which is supported by the idler wheels (described in more detail below), is achieved. In this manner the drive wheel 7 is able to place the discharge belt 5 in motion in either direction depending on the rotational direction of drive axle 9, which is signaled and controlled by the hydraulic motor. The present drive system has the advantage of preventing slippage of the belt 5 when powered, as can happen in conventional conveyor belt systems utilizing rollers. One drive wheel 7 at one end of the bucket 1 is provided and is sufficient to drive the discharge belt 5.

Figure 4:
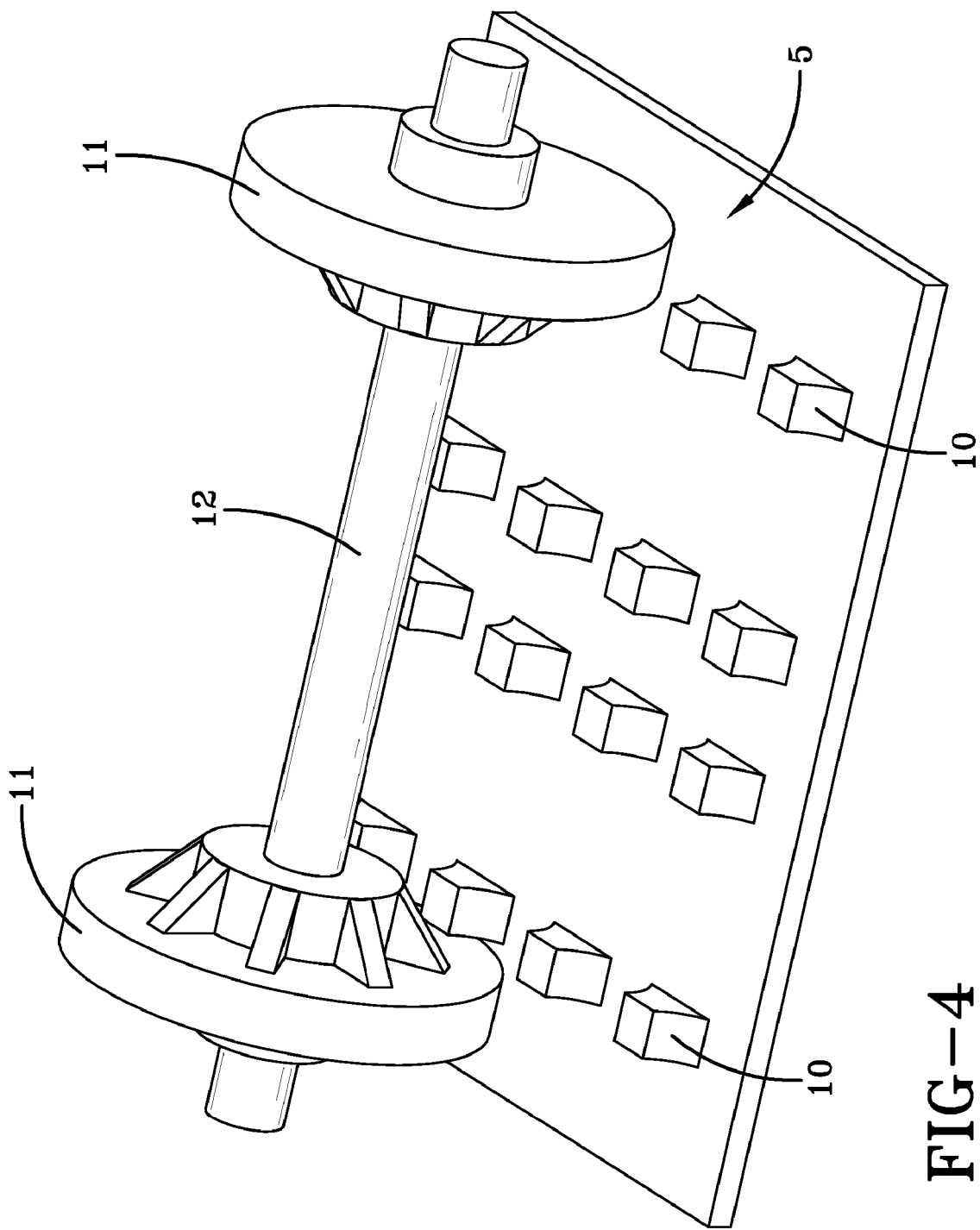
FIG. 4 is a photograph view of an idler wheel and axle in position relative to the underside of the discharge belt.

Referring to FIG. 4, idler wheels 11 are shown attached to axle 12, in contact with the underside of discharge belt 5. Idler wheels 11 support the discharge belt 5 and are not powered. Idler wheels 11 are set apart at a distance such that they are positioned immediately outside the two exterior rows of drive knobs 10. This feature ensures that the discharge belt is always aligned on the idler wheels, by preventing movement slippage of the belt to either side. Six sets of idler wheels 11 are provided at equal distances along the width of the bucket 1, as can be seen in FIG. 2. The axles 12 are securely and rotationally attached within the open frame described in paragraph 0014. The idler wheels 11 are double ball bearing wheels for improved weight support.

Referring to FIGS. 5A and 5B the drive mechanism comprises hydraulic drive motor 13, which is connected with standard hydraulic connections to the loader's hydraulic system. Drive motor 13 is operated through the standard controls provided by the loader. Drive motor 13 operates sprocket 14, which rotates chain 15. Chain 15 in turn drives sprocket 16, which is fixedly attached to the drive axle 9. Adjusting tension wheel 17 controls the tension in chain 15. Adjusting the speed of the drive motor 13 varies the speed of the discharge belt 5. In this way the volume of aggregates discharged per unit of time can be varied. If a constant discharge of aggregates is required the drive motor can be fitted with a flow control valve to maintain the speed of the drive motor 13 constant.

Figure 6:
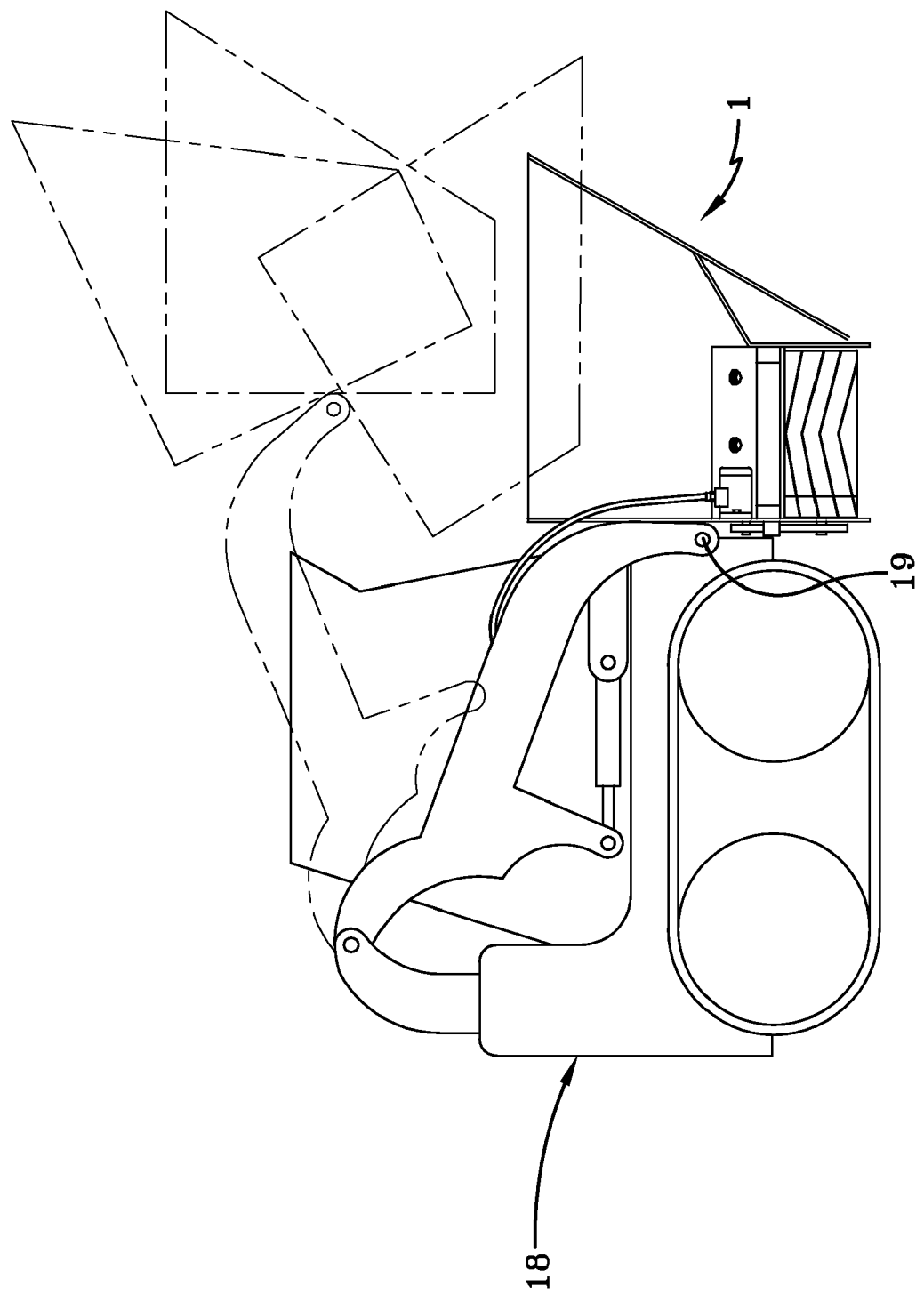
FIG. 6 is a side elevation view of a loader with the bucket mounted on it, showing different possible orientations of the bucket.

Referring now to FIG. 6 the bucket 1 is attached to loader 18 through a standard industry attachment 19. As can be seen in the diagram, in addition to the above-described novel features, the bucket 1 can also be manipulated to load the bucket in a conventional manner. Depending on the required application the bucket can be raised to any elevation. An example of such an application is placing aggregate in elevated bins.

Due to its industry standard attachment and hydraulic connection, the lateral discharge bucket can be mounted on any existing loader. In one embodiment, for example, the bucket can be attached to a telescopic handler for delivering and unloading aggregates to high elevation places, such as roofs.

Other advantages, which are inherent to the structure, are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A bucket for use in association with a loader, the bucket providing both top and lateral discharge, the bucket comprising:
    a frame having front and rear walls and a pair of opposing side walls;
    an endless loop of conveyor belt, arranged such that a portion of the front and rear walls, the side walls and a portion of the endless loop define the bucket, with the lateral discharge provided by a gap between the endless loop and each of the opposing side walls; and
    a motor rotating a drive wheel axle with a drive wheel fixedly secured thereon to selectively drive the endless loop towards either of the opposing side walls wherein the drive wheel comprises a plurality of drive sprockets engaging drive knobs attached to an underside of said endless loop; and
    a plurality of non-powered idler wheels in contact with an underside of the endless loop, positioned immediately outside two exterior rows of drive knobs.

2. The bucket of claim 1, wherein the drive wheel is located at one end of said endless loop.

3. The bucket of claim 1, further comprising a plurality of flexible slides, at least one attached to the bottom of each of the side walls, said slides at least partially filling the gap between the side wall to which it is attached and said endless loop.

4. The bucket of claim 1, wherein said endless loop extends beyond each of the side walls.

5. The bucket of claim 1, wherein the front wall and the rear wall of said bucket frame extend downwardly beyond the bottom of said endless loop.

6. The bucket of claim 1, wherein the driving means is controlled from a loader's control panel.

7. The bucket of claim 1, wherein the side walls of said bucket frame are sloped inward.

8. The bucket of claim 6, wherein the front wall and the rear wall of said bucket frame are sloped inward.

9. The bucket of claim 1, further comprising:
    an angled beam, positioned above the conveyor belt and spanning from one side wall to the other.

10. A bucket for use in association with a loader, the bucket providing both top and lateral discharge, the bucket comprising:
    a frame having front and rear walls and a pair of opposing side walls;
    an endless loop of conveyor belt, arranged such that a portion of the front and rear walls, the side walls and a portion of the endless loop define the bucket with the lateral discharge provided by a gap between the endless loop and each of the opposing side walls; and
    a means for selectively driving the endless loop towards either of the opposing side walls; and
    an angled beam, positioned above the conveyor belt spanning from one side wall to the other wherein the angled beam is an "L" beam, mounted in an "upside-down V" configuration.

11. The bucket of claim 10, further comprising:
    a plate, adjustably positioned on an arm of the angled beam, for adjusting a gap between the angled beam and the conveyor belt.

* * * * *